Patented Jan. 12, 1943

2,308,245

UNITED STATES PATENT OFFICE 2,308,245

PAVING ASPHALT PRODUCTION

Roman Leo Ortynsky, Alton, Ill., assignor to Shell Development Company, San Francisco, Calif., a corporation of Delaware No Drawing. Application June 28, 1941, Serial No. 400,295

9 Claims. (Cl. 196—74)

This invention deals with a process for producing Mexican type asphalts, and more particularly is concerned with the manufacture of paving asphalts having properties equal to or better than Mexican asphalts, from asphaltic crude oils which normally yield inferior asphalts.

Mexican type asphalts have been considered the best available for making pavements. However, the demand for such asphalts vastly surpasses the availability, and a process which enables the production of Mexican type asphalts from sources other than Mexican crudes is therefore of considerable importance.

Mexican asphalts are characterized by the combination of unusually high ductilities, penetration indexes and fluidity factors. It is generally conceded that when the composition of a natural asphalt is changed in some manner to improve one of these properties, such improvement in one property is usually gained at the expense of the other. Thus, for example, if the penetration index of an asphalt is improved as by air blowing, its ductility is reduced; or if the ductility of an asphalt is raised as by blending asphaltic resins thereto, the penetration index suffers.

Now I have discovered that asphalts having a ductility-penetration index relationship, which is equal to or better than that of Mexican asphalt, can be produced from any asphaltic crude, provided the procedure hereafter described with its limitations, proportions, etc., is strictly observed.

The procedure to be followed is in its broadest aspects outlined in the copending application of Lovell, Isted and Ortynsky, Serial No. 393,002, filed May 12, 1941, according to which a so-called precipitated asphalt obtained from a short residue by precipitation with a liquid normally gaseous hydrocarbon such as propane, is oxidized to an asphaltene content of between 50%–60%, and the resulting asphalt is blended with a suitable flux, preferably one of high aromaticity.

While by the process outlined in said application, asphalts are obtained having properties superior to those of the natural asphalts contained in the crude oil, the properties of Mexican asphalts can be met only by proceeding as follows:

The starting material must be an asphalt having the following composition:

| | Per cent |
|---|---|
| Asphaltenes | 1.5– 5 |
| Heavy petroleum resins | 50–65 |
| Heavy aromatic oil | Balance |

Asphaltenes are determined by precipitation with aromatic-free 60°–80° Bé. naphtha. Resins are normally solid compounds insoluble in propane and adsorbable on silica gel. The aromatic oil should have a specific dispersion above 200. Both the resins and the aromatic oil must have a very high average molecular weight, i. e., in excess of about 500, and in the absence of low flash solvents or contaminants, both the aromatic oils and the resins should have flash points above 500° F. and preferably above 600° F. Asphalts having the above compositions are most easily produced by treating a so-called short residue of a mixed base crude with liquid propane, whereby asphaltic material is precipitated. A short residue is one from which the light hydrocarbons, as well as lubricating distillates, have been removed by fractional distillation to result in a residue having a flash point of at least 500° F.

If desired, however, the asphalt used as starting material may be produced by blending the various components or by supplying one component or the other to an asphalt being deficient therein. The most frequent deficiency is probably that of resins. A convenient supply of resins is had in the extracts produced by solvent extracting bright stocks. These extracts may be added directly to the asphalt to make up for any deficiency in resins.

The starting asphalt is oxidized by blowing it with air at a temperature between 400°–550° F., preferably 450°–500° F., until an asphaltene content between 50%–60% and a softening point of at least 360° F. are attained. If the composition of the starting material is kept within the limits described, there is usually little difficulty in meeting both these requirements for the oxidized asphalt. If, however, the original composition is materially outside the prescribed limits, the softening point may be too low even though the desired asphaltene content has been reached, or else the blown asphalt cannot later be dispersed in the desired degree.

An explanation as to why the above conditions must be maintained for good results may possibly be found in an observation which I have made, which observation indicates that several reactions take place during the blowing, some simultaneously and others consecutively. At the beginning of the oxidation, the principal reaction appears to be one of conversion of resins to asphaltenes and of the oil to resins. After a while, however, a change begins to take place in the asphaltenes themselves, and it seems to be essential that the blown product contain changed and unchanged asphaltenes in certain amounts and proportions, in order that the final asphalt have the desired properties. Unless the starting material has the correct composition, the necessary proportions of the different types of asphaltenes are not obtained.

The blown asphalt having a total asphaltene content between 50%–60% and a softening point above 360° F. is then fluxed with a hydrocarbon extract having a Say. furol viscosity of 30–200 at 275° F. The fluxing may be carried out by thoroughly agitating the asphalt and extract at temperatures of about 400°–550° F. For making paving asphalts the proportions of extract should be between 1.1 and 1.6 parts per part of the blown asphalt.

Extracts as herein defined are petroleum fractions soluble in twice their own volume of an organic so-called naphthenic solvent having preferential solvent powers for aromatics, such as phenol, furfural, nitrobenzene, aniline, beta-beta-dichlordiethyl ether, at temperatures of about 100° F.

The viscosity limits of the extracts used for blending are important. It has been found that the oxidized asphalt must be dispersed in the flux in just the proper degree in order that the final product have both high ductility and penetration index. If the viscosity of the extract is too low, the asphalt will be insufficiently dispersed, and the ductility will be low. If, on the other hand, the viscosity is too high, the ductility will be good but the penetration index will be low. It is further necessary that the extract be not too long, i. e., it should consist of a narrow fraction having a fairly narrow boiling range in order that the dispersing agents contained therein be substantially uniform. Suitable oils, upon fractional vacuum distillation through three theoretical plates, should produce 10% bottoms having viscosities not greater than 75% in excess of those of the originals. Such oils normally possess flash points not below about 500° F.

Likewise, with regard to the proportions of flux to blown asphalt in the production of paving asphalts, the limitations set out above must be observed closely. If the proportions are too low, the ductilities at intermediate temperatures fall off. On the other hand, proportions in excess of those stated are reflected in low viscosities at 275° F. for a given penetration, i. e., in high temperature-viscosity susceptibilities.

The resulting fluxed blown asphalt is still too hard for paving purposes, and therefore it must be further blended with oil to adjust its hardness to the desired penetration, suitable penetrations of paving asphalts normally being between about 25–200 at 77° F. The oil which I have found to be most suitable for this purpose is preferably a distillate having a Say. Universal viscosity of 400–1100 at 100° F. and having a viscosity index above about zero. The amount of this oil required is normally between about 10%–25% by weight of the final blend, depending upon the desired penetration of the paving asphalt and the subsequent amount of extract oil used for fluxing. Inasmuch as the viscosity index of the adjusting oil has also an influence on the delicately balanced degree of dispersion of the blown asphaltenes in the final asphalt, it is desirable to observe limits in the proportions of extract oil to blown asphalt even narrower than those set out above. Thus, if the viscosity index of the adjusting oil is between about 0–15, the ratio of extract oil to blown asphalt is preferably between 1.1:1 and 1.4:1. If, on the other hand, the viscosity index of the adjusting oil is of the order of 85–100, this ratio should be between 1.3:1 and 1.6:1. Adjusting oils of intermediate viscosity indexes obviously call for ratios of extract oil to blown asphalt halfway between the outside limits indicated.

It is desirable that the oils chosen for adjusting the penetration have a viscosity between the limits indicated, because if too low, the asphalt fails to meet the standard requirements for maximum vaporization on heating, and if too high, the amounts required to meet normal paving asphalt penetrations would be so large as to throw the peptization of the blown asphaltenes off balance.

Results obtainable in my process are clearly illustrated in the example below:

A precipitated asphalt obtained by propane precipitation from a reduced Mid-Continent crude having a Say. Univ. viscosity at 210° F. of 435 sec. was blown at 450° F. to a softening point of 370° F. The asphaltene content of the product was 53%, as determined by precipitation with 60°–80° Bé. naphtha.

An extract was produced by Duosol extraction of a short deasphalted Mid-Continent residue having a Say. Univ. viscosity at 210° F. of 300 seconds. The extract had an 80 penetration at 77° F., a softening point of 112° F. and a Say. furol viscosity at 275° F. of 48.

In the table below are shown the properties of two blends, one within the disclosed limits and another just outside. For comparison, the corresponding properties of a typical Mexican asphalt (steam-refined Panuco asphalt) are given.

The oil used for adjusting the penetration of the blends was a distillate oil having a Say. Univ. viscosity of 420 at 100° F. and a viscosity index of 10.

| Asphalt | Blend 1 | Blend 2 | Panuco |
|---|---|---|---|
| Composition: | | | |
| Oxidized asphalt | 39.1 | 41.5 | |
| Extract oil | 45.3 | 41.5 | |
| Adjusting oil | 15.6 | 17.0 | |
| Ratio of extract to oxidized asphalt | 1.16 | 1.00 | |
| Properties: | | | |
| Penetration at 77° F | 63 | 50 | 56 |
| Softening point °F | 135 | 141 | 131 |
| Penetration index | +1.1 | +1.2 | +0.3 |
| Say. furol viscosity at 275° F | 357 | 488.5 | 483 |
| Fluidity factor | 185 | 219 | 239 |
| Ductility at 77° F. 5 cm./min | 110+ | 65 | 110+ |
| Ductility at 32° F. ¼ cm./min | 10+ | 7 | 6.5 |
| Oliensis spot test | Neg. | Neg. | Neg. |

As will be seen from the above data for comparable penetration indexes, the ductility of composition 2, particularly at 77° F., is low, whereas that of composition 1 meets that of Panuco asphalt.

I claim as my invention:

1. Process for producing a Mexican type paving asphalt comprising oxidizing an asphalt having the following composition:

|  | Per cent |
|---|---|
| Asphaltenes | 1.5–5 |
| Petroleum resins | 55–65 |
| Aromatic oil | Balance | said resins and said oil having specific dispersions above 200 and flash points above 500° F., to produce an oxidized asphalt having an asphaltene content of 50%–60% and a softening point of at least 360° F., fluxing said oxidized asphalt with 1.1 to 1.6 parts of petroleum extract per part of oxidized asphalt, said extract having a Say. furol viscosity of 30–200 at 275° F. and a flash point of at least 500° F., and blending with the resulting fluxed asphalt an amount of a hyirocarbon distillate having a Say. Universal viscosity between 400 and 1100 at 100° F. and a viscosity index above about zero, said amount being such to produce a blended asphalt having a penetration of 25–200 at 77° F.

2. The process of claim 1 wherein said amount of hydrocarbon distillate is from 10%–25% by weight of the blended asphalt.

3. The process of claim 1 wherein said resins and aromatic oil have average molecular weights above 500.

4. The process of claim 1 wherein said oxidized asphalt is fluxed with not more than 1.4 parts of petroleum extract, and the viscosity index of said hydrocarbon distillate is about 0–15.

5. The process of claim 1 wherein said oxidized asphalt is fluxed with at least 1.3 parts of petroleum extract and the viscosity index of said hydrocarbon distillate is about 85–100.

6. The process of claim 1 wherein said asphalt composition is oxidized by air-blowing at a temperature between 400°–550° F.

7. Process for producing Mexican type asphalts from mixed base crude containing asphalt comprising topping said crude to produce an asphaltic residue having a flash point above 500° F., treating said residue with liquid propane to precipitate said asphalt, oxidizing the latter to produce an oxidized asphalt, having an asphaltene content of 50%–60% and a softening point of at least 360° F., fluxing said oxidized asphalt with 1.1 to 1.6 parts of petroleum extract per part of oxidized asphalt, said extract having a Say. furol viscosity of 30–200 at 275° F. and a flash point of at least 500° F., and blending with the resulting fluxed asphalt an amount of a hydrocarbon distillate having a Say. Universal viscosity between 400 and 1100 at 100° F. and a viscosity index above about zero, said amount being such to produce a blended asphalt for a penetration of 25–200 at 77° F.

8. The process of claim 7 wherein said topped crude has a flash point above 600° F.

9. The process of claim 1 wherein said asphalt composition is oxidized by air as the sole oxidizing agent.

ROMAN LEO ORTYNSKY.